Feb. 22, 1927.

E. C. HATCHER 1,618,927

POWER TRANSMITTING GEARING

Filed Aug. 2, 1926

INVENTOR
Ernest C. Hatcher
BY
ATTORNEY

Feb. 22, 1927. 1,618,927
E. C. HATCHER
POWER TRANSMITTING GEARING
Filed Aug. 2, 1926   3 Sheets-Sheet 2

INVENTOR
Ernest C. Hatcher
BY
ATTORNEY

Feb. 22, 1927.
E. C. HATCHER
1,618,927
POWER TRANSMITTING GEARING
Filed Aug. 2, 1926    3 Sheets-Sheet 3
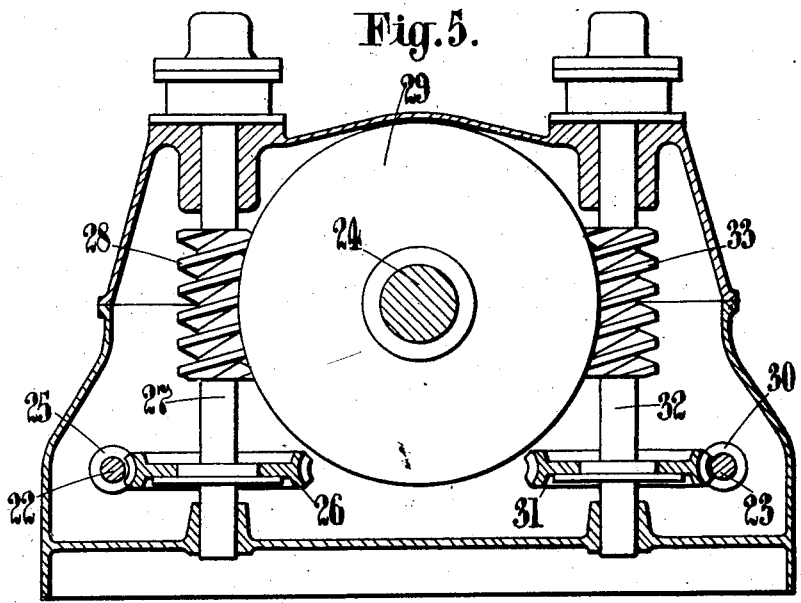
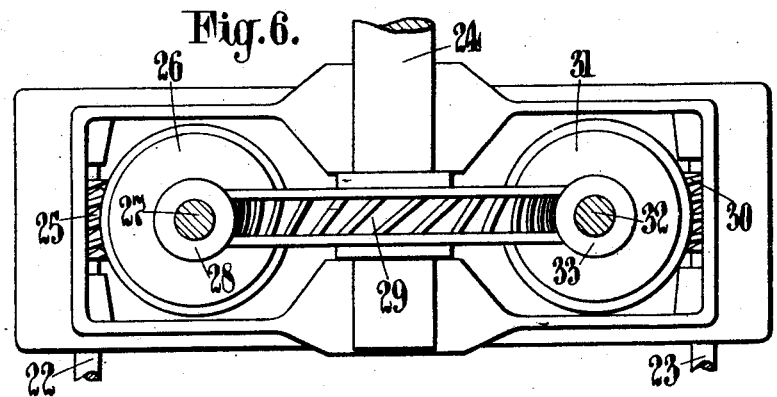
INVENTOR
Ernest C. Hatcher
BY
ATTORNEY Patented Feb. 22, 1927.

1,618,927

UNITED STATES PATENT OFFICE.

ERNEST CHARLES HATCHER, OF FINCHLEY, LONDON, ENGLAND.

POWER-TRANSMITTING GEARING.

Application filed August 2, 1926, Serial No. 126,594, and in Great Britain January 29, 1925.

This invention relates to power transmission gearing in which rotary motion is transmitted successively from one shaft to another through two or more sets of worm and worm wheel gearing, in succession, and is more particularly directed towards the provision of a construction providing for a more balanced or even torque or couple applied to the ultimate driven member of the train of gearing and also providing for the elimination of end thrust from the driving shaft.

In a convenient constructional arrangement in accordance with this invention, a worm wheel on the ultimate driven shaft is rotated by driving efforts applied thereto through two worm wheels arranged in positions which are more or less diametrically opposite with respect to the axis of the driven shaft. In this manner a balanced torque or turning moment is applied to the ultimate driven worm wheel with corresponding advantages. An arrangement may also be provided in which the end thrust in the driving shaft can be taken up by the worm and worm wheel gearing by balancing the thrust of each set of gearing against the other.

In the accompanying drawing:—

Figures 5 and 6 are also views similar to Figures 1 and 2, illustrating a further modification.

Figure 1:
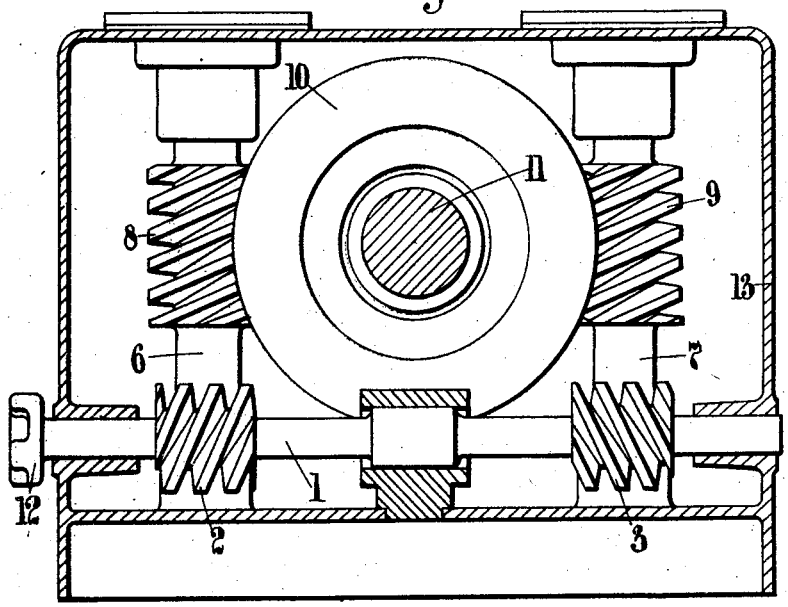
Figure 1 is a side view, partly in section, of power transmission gearing arranged in accordance with this invention.
Figure 2:
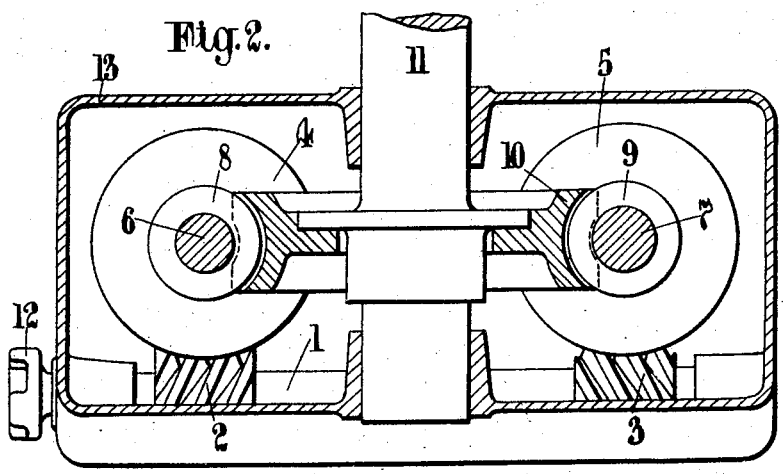
Figure 2 is a plan view thereof in section on the centre line of the driven shaft.

Referring to Figures 1 and 2, 1 is a driving shaft having worms 2, 3 mounted thereon in gear with worm wheels 4, 5, on transmission spindles 6, 7, respectively carrying worms 8, 9, in gear with a worm wheel 10 on the ultimate driven spindle 11, the worms 8, 9, being arranged on opposite sides of the said ultimate driven spindle. The driving shaft 1, is mounted in its bearings so that it is axially movable through a short distance and the threads on the worms are of opposite direction or twist. By reason of this construction, when the shaft 1 is transmitting power to the worm wheel trains, it adjusts itself to a position such that the power transmitted through each of the transmission spindles is equal. To allow such axial movement, the said driving shaft can be driven through a convenient form of driving clutch 12. Since the efforts respectively transmitted through the worms 8, 9, and the corresponding trains of gearing are equal, the torque or turning moment applied to one side of the worm wheel 10, is balanced by that applied on the opposite side. By reason of the opposite arrangement of the threads of the worms on the driving shaft and its freedom to move axially no end thrust is transmitted along this shaft and it is not necessary to provide any thrust bearing to oppose such end thrust.

The whole of the gearing can be conveniently arranged within a closed casing 13, to which lubricant can be supplied in the usual manner.

Figure 3:
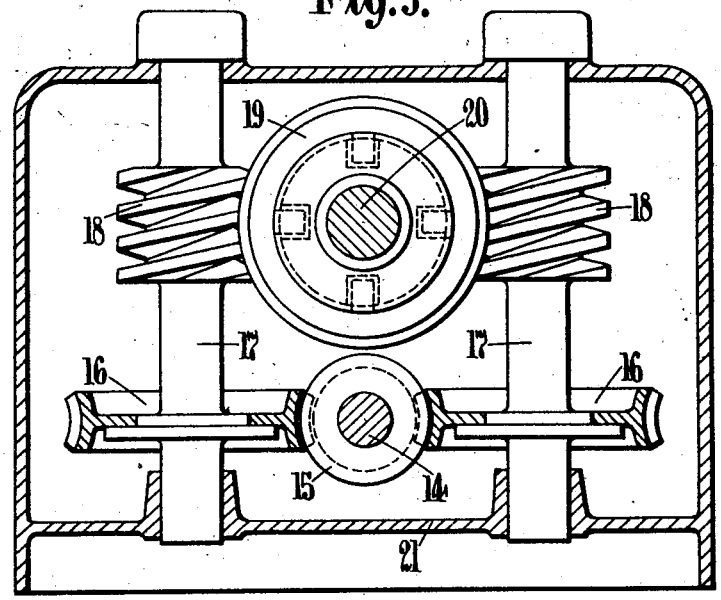
Figures 3 and 4 are similar views illustrating a modification.
Figure 4:
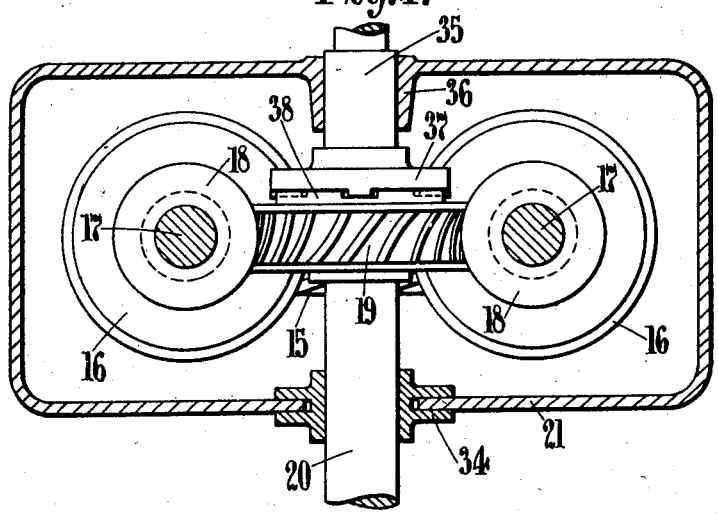

In an alternative arrangement, shown in Figures 3 and 4, the driving shaft 14 carries a worm 15 in gear with worm wheels 16 on transmission spindles 17 carrying worms 18 arranged on opposite sides of a worm wheel 19 mounted on an intermediate driven shaft 20.

The shaft 20 is carried in a bearing 34 supported in the casing 21 so as to be freely movable therein in a direction transverse to the wheel. The wheel 19 can then take up a position such that the driving efforts exerted on its opposite sides are equalized. The wheel 19 is operatively connected with the ultimate driven shaft 35, carried in a fixed bearing 36, by means of a suitable coupling compensating for want of alignment between the shaft, for example, a coupling comprising disc members one of which has grooves therein in which projections on the other can slide. In the operation of this gearing a balanced effort is exerted on the driven shaft, but this construction does not provide against end thrust on the driving shaft.

In the further modified arrangement illustrated in Figures 5 and 6, two driving shafts 22, 23, are provided to transmit power to a single driven shaft 24. This construction can be conveniently employed in the case of driving shafts actuated by separate cylinders of a multiple cylinder engine or by different engines or turbines, or by different sets of blades within the same turbine. A worm 25, on one driving shaft 22 acts through a worm wheel 26 transmission spindle 27, and worm 28 on one side of the worm wheel 29, on the ultimate driven shaft 24, whilst the other driving shaft 23 acts through a worm 30, worm wheel 31, transmission spindle 32 and worm 33 on the opposite side of the said worm wheel 29.

When equal power is transmitted through both driving shafts 22, 23, an exactly balanced couple is exerted on the driven shaft. In case the power transmitted through one driving shaft momentarily diminishes the other shaft has an extra load placed upon it to compensate for the diminution of power transmitted by the other shaft so as to keep the driven shaft running more or less uniformly.

I claim:

1. Gearing for transmitting power from a driving shaft to a driven shaft, comprising a worm wheel on the driven shaft and two trains of worm and worm wheel gearing, each train comprising a worm on the driving shaft, a transmission spindle, a worm wheel on the said spindle in gear with the worm on the driving shaft, and a worm on the transmission spindle spaced apart from the worm wheel thereon and in gear with the worm wheel on the driven shaft, the worms on the spindles acting on opposite sides of the worm wheel on the driven shaft and the phase of each train being adjustable relatively to the other train to equalize the driving efforts exerted on opposite sides of the said worm wheel on the driven shaft.

2. Gearing for transmitting power from a driving shaft to a driven shaft, comprising a worm wheel on the driven shaft and trains of worm and worm wheel gearing, each train consisting of a driving shaft worm, a transmission spindle, a worm wheel on said spindle in gear with the driving shaft worm of its train, and a worm on the transmission spindle spaced apart from the worm wheel thereon, the worms on the transmission spindle gearing with the worm wheel on the driven shaft and the driving shaft worms being movable to different positions to equalize the driving effort transmitted by each train from the driving to the driven shaft.

3. Gearing for transmitting power from a driving shaft to a driven shaft, comprising a worm wheel on the driven shaft and two trains of worm and worm wheel gearing, each train comprising a worm on a driving shaft, a transmission spindle, a worm wheel on the said spindle in gear with the worm on the driving shaft, and a worm on the transmission spindle spaced apart from the worm wheel thereon and in gear with the worm wheel on the driven shaft, the phase of each transmission spindle being adjustable relatively to that of the other transmission spindle to equalize the driving effort transmitted by each train.

4. Gearing for transmitting power from a driving shaft to a driven shaft, comprising a worm wheel on the driven shaft and two trains of worm and worm wheel gearing, each train comprising a worm on a driving shaft, a transmission spindle, a worm wheel on the said spindle in gear with the worm on the driving shaft, and a worm on the transmission spindle spaced apart from the worm wheel thereon and in gear with the worm wheel on the driven shaft, the worms on the spindles acting on opposite sides of the worm on the driven shaft, separate worms of opposite twist being provided on the driving shaft and respectively included in separate trains, the said driving shaft being axially adjustable in its bearings.

5. Gearing for transmitting power from a driving shaft to a driven shaft, comprising a worm wheel on the driven shaft and two like trains of gearing, each train comprising a driving shaft worm, a transmission spindle, a worm wheel on the said spindle in gear with the driving shaft worm of its train, and a worm on the transmission spindle spaced apart from the worm wheel thereon and in gear with the worm wheel on the driven shaft.

ERNEST CHARLES HATCHER.